E. BIGGS.
MULTIPLE BAKE PAN.
APPLICATION FILED JAN. 29, 1920.
1,395,030. Patented Oct. 25, 1921.
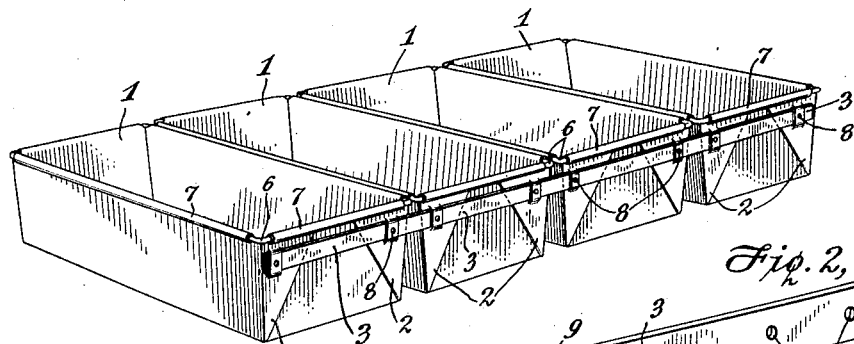
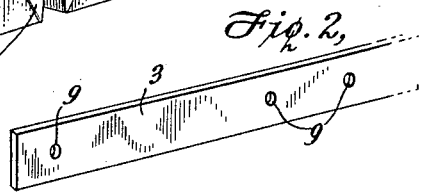
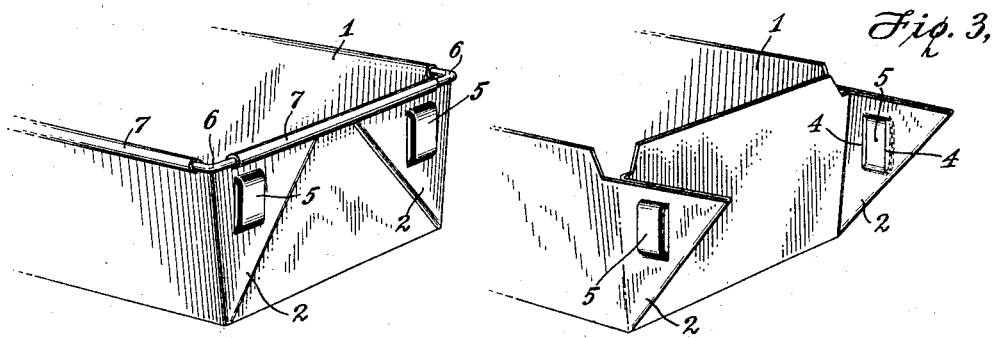
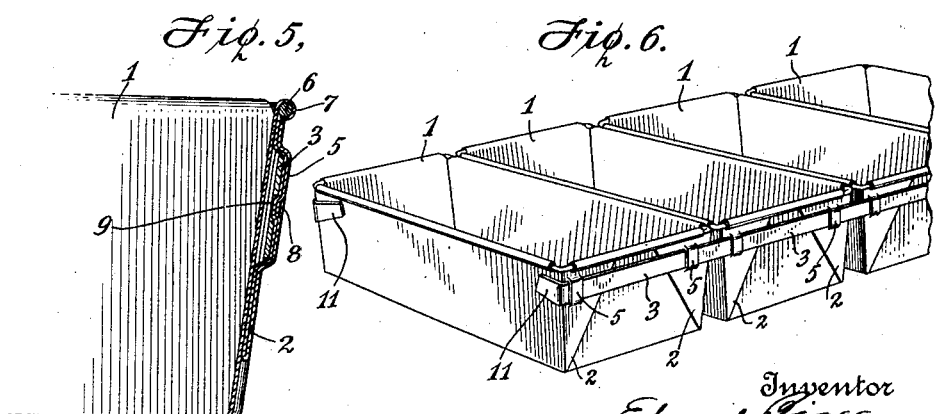
Inventor
Edward Biggs
By his Attorneys

UNITED STATES PATENT OFFICE.

EDWARD BIGGS, OF NEW YORK, N. Y., ASSIGNOR TO WOOD AND SELICK, INC., OF NEW YORK, N. Y., A CORPORATION OF MAINE.

MULTIPLE BAKE-PAN.

1,395,030.      Specification of Letters Patent.      Patented Oct. 25, 1921.

Application filed January 29, 1920. Serial No. 354,918.

*To all whom it may concern:*

Be it known that I, EDWARD BIGGS, United States citizen, residing at West New Brighton, borough of Richmond, city and State of New York, have invented the following-described Improvements in Multiple Bake-Pans.

The multiple bake pan of my invention comprises a plurality of individual pans united by a connecting bar or bars. The invention consists essentially in a simple, rugged and cheaply produced form of attachment between the individual pans and the bars, having various advantages and capable of application to bake pan sets in various different ways as will hereinafter be made apparent.

In the accompanying single sheet of drawing, which forms a part of this specification, I have illustrated the best embodiments of my invention of which I am now aware. Figure 1 is a perspective of a multiple bake pan embodying the preferred form of my invention; Fig. 2, a perspective of one of the connecting bars; Fig. 3 is a perspective of one of the individual pans in process of manufacture; Fig. 4 a complete individual pan; Fig. 5, a vertical section through the attachment between pan and bar and Fig. 6 is a perspective illustrating another form of my invention.

Each of the individual rectangular pans or units 1 of the multiple bake pan of Figs. 1 and 6, is bent to shape from an unbroken, substantially rectangular sheet of metal in such a manner as to produce an external triangular fold 2 at each corner taking up the material not needed for the sides and ends; in the finished pan these folds are flattened against the sides of the pan. My invention is particularly applicable to this common type of pan, but it is also applicable to pans having folds, or equivalent members produced in any manner. I utilize such folds as the connecting means between the individual pans and the bars 3 by shaping or cutting them in such way that a part of each fold is raised from the plane of fold and caused to embrace the body of the bar. Preferably there is at least one connecting bar at each side or end of each pan, and the folds embracing the bar or bars are flattened against the sides of the pans that are adjacent the bars. The grasping part of each fold may be, and preferably is, raised between two parallel vertical cuts or slits 4 which allow the metal strip 5 to be extruded in loop form, so that the connection bar 3 may be slipped into and through these loops as shown in Figs. 1, 5 and 6. The slits may be cut, and the loops formed, at any stage of the manufacture of the pan, but I have found it specially desirable to take this step prior to the bending of the folds against the pan (see Fig. 3), the folds being thereafter pressed to their final positions (Fig. 4). The tops of the finished folds may be located below the rim wire 6 and the sheet metal of the adjacent side wall curved thereover, as at 7, in accordance with common practice. It is necessary that the connecting bar be closely engaged by the pan material (see Fig. 5) in order that the attachment may be rigid; for ease in assembly, the loops are first made sufficiently large to admit the bar easily and thereafter the attachment is made rigid by firmly pressing the metal about the bar and against the pan side which makes a secure attachment. Further security may be obtained, if desired, by specially anchoring each loop or fold to the bar. Preferably, for this purpose, some of the material of each loop is pressed or punched into the bar 3 or against a shoulder thereon, as at 8, which may be done at the same time the loop is compressed about the bar and to the pan wall. The bar may be provided previously with holes or recesses 9, properly located to receive the punched depressions in the loops, or these holes or recesses may be omitted, the loop material being dented into the plane face of the bar by sufficient pressure. Fig. 6 illustrates another means for holding the bars against longitudinal movement with respect to the pans. In this case the pans may be assumed to be contiguous along their side rims or separated from each other by spacers common in the art; the connecting bars are secured in the loops 5 as before but the depressions or dents 8 are omitted and the ends of the bars 3 are bent about the corners of the end pans of the set. The bars are thus held with respect to all the pans of the set. It will be observed in respect to both the described form of the invention, that the individual pans may be constructed in various ways and can be spaced from each other such varying distances as may be required, either by means of special spacers such as just referred to, or by means of the bars themselves.

While I have described above the best embodiments of my invention of which I am now aware, it will be understood that these embodiments are merely illustrative and that my invention is not limited thereto but is set forth in the following claims.

Claims.

1. A multiple bake pan comprising a plurality of individual pans and a connecting bar extending across the latter, the pans being formed with take up folds and a part of each of said folds being raised to embrace the body of the bar to form an attachment therewith.

2. A multiple bake pan comprising a plurality of individual pans having integral slotted folds and a connecting bar extending across the individual pans and occupying the slots in the folds to attach the individual pans.

3. A multiple bake pan comprising a plurality of individual rectangular pans and a connecting bar extending across the latter, the individual pans having integral corner folds at the sides thereof adjacent the bar and a part of each of said folds being raised to embrace the body of said bar to attach the individual pans, each fold and adjacent pan side and part of the bar being pressed together.

4. A multiple bake pan comprising a plurality of individual rectangular pans and a connecting bar extending across the latter, the individual pans having integrally formed corner folds at the sides thereof adjacent the bar and a part of each of said folds being raised to embrace the body of said bar to attach the individual pans thereto and depressed into the bar to prevent relative longitudinal movement of the latter.

5. A multiple bake pan comprising a plurality of individual pans, a connecting bar extending across the latter, the individual pans having integrally formed take up folds and a part of each of said folds being raised to embrace the body of said bar to attach the individual pans thereto, and means to prevent longitudinal movement of the bar relative to the pans.

6. A multiple bake pan comprising a plurality of individual rectangular pans arranged in a row having integrally formed corner folds and a connecting bar extending across said pans, the folds being at the sides of the pans adjacent the bar and each of said folds being provided with two parallel vertical slots providing a loop through which the bar extends to attach the individual pans.

7. A multiple bake pan comprising a plurality of individual rectangular pans arranged in a row having integrally formed corner folds and a connecting bar extending across said pans, the folds being at the sides of the pans adjacent the bar and each of said folds being provided with two parallel vertical slots providing a loop through which the bar extends to attach the individual pans and a part of the material of each loop being depressed into the material of the bar to prevent relative longitudinal movement thereof.

8. In the manufacture of multiple bake pans comprising a plurality of individual pans held together by a connecting bar, the method which consists in raising a part of an integral take up fold of each individual pan to form a loop prior to the bending of the fold against the pan side, inserting the bar in said loops and then compressing the folds against the pan sides to cause them to tightly embrace the connecting bar.

In testimony whereof, I have signed this specification.

EDWARD BIGGS.